(12) United States Patent
Ao et al.

(10) Patent No.: US 8,995,789 B2
(45) Date of Patent: Mar. 31, 2015

(54) EFFICIENT COLLAGING OF A LARGE IMAGE

(71) Applicant: Microsoft Corporation, Redmond, WA (US)

(72) Inventors: Xiang Ao, Shanghai (CN); Mingpiang Xu, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 13/916,232

(22) Filed: Jun. 12, 2013

(65) Prior Publication Data
US 2014/0368536 A1     Dec. 18, 2014

(51) Int. Cl.
*G06K 9/36* (2006.01)
*G06T 1/60* (2006.01)
*G09G 5/377* (2006.01)

(52) U.S. Cl.
CPC . *G06T 1/60* (2013.01); *G09G 5/377* (2013.01)
USPC ........................................................ 382/284

(58) Field of Classification Search
CPC .... G06T 3/4038; G06T 11/60; H04N 1/3876; H04N 5/23238; G06K 2009/2045
USPC ................................................ 382/284, 294
See application file for complete search history.

(56) References Cited

U.S. PATENT DOCUMENTS

2004/0071367 A1* 4/2004 Irani et al. ..................... 382/284
2013/0024479 A1   1/2013 Gong et al.

OTHER PUBLICATIONS

Sar?yuce, et al.,"Scalable Hybrid Implementation of Graph Coloring using MPI and OpenMP", In Proceedings of 26th IEEE International Parallel and Distributed Processing Symposium Workshops, May 21, 2012, 10 pages.
Qui1, et al.,"Hybrid Cloud and Cluster Computing Paradigms for Life Science Applications", In Proceedings of 11th Annual Bioinformatics Open Source Conference (BOSC) 2010, Dec. 10, 2010, 6 pages.
Hoefler, et al.,"Towards Efficient MapReduce Using MPI", In Proceedings of Recent Advances in Parallel Virtual Machine and Message Passing, Sep. 7, 2009, 10 pages.
Plimpton, et al.,"MapReduce in MPI for Large-scale Graph Algorithms", In Proceedings of Parallel Computing, vol. 37, Issue 9, Sep. 2011, 39 pages.
Cary, et al.,"Experiences on Processing Spatial Data with MapReduce*" In Proceedings of the 21st SSDBM Conference, Jun. 2, 2009, 18 pages.

(Continued)

*Primary Examiner* — Duy M Dang
(74) *Attorney, Agent, or Firm* — Ben Tabor; Ramesh Kuchibhatla; Micky Minhas

(57) ABSTRACT

Embodiments of the present invention relate to collaging image data to form a large image using high-performance computing in a parallel computing environment. The collaging of the image data includes performing an intra-node merge operation on image data such that the merged intra-node data is not written to the file system, but instead maintained in volatile processor memory. The intra-node merged data is may then be communicated in a memory-to-memory manner over a high-speed network to another node in the system for an inter-node merge operation, which limits the number of intermediate system I/O operations to perform the collaging process. Following the intra-node and inter-node merge operations, tiles representing the collaged image may be written to a file system memory for persistent storage.

20 Claims, 4 Drawing Sheets

(56) References Cited

OTHER PUBLICATIONS

Mohamed, et al.,"Enhancing MapReduce using MPI and an Optimized Data Exchange Policy", In Proceedings of Fifth International Workshop on Parallel Programming Models and Systems Software for High-End Computing (P2S2), 2012, Sep. 10, 2012, 28 pages.

Gleich, David,"Why MapReduce is Successful: it's the IO!", Published on: Oct. 5, 2012, Available at: http://dgleich.wordpress.com/2012/10/05/why-mapreduce-is-successful-its-the-io/.

BR"Web-Scale Computer Vision using MapReduce for Multimedia Data Mining", In Proceedings of Proceedings of the Tenth International Workshop on Multimedia Data Mining, Jul. 25, 2010, 10 pages.

* cited by examiner

EFFICIENT COLLAGING OF A LARGE IMAGE

BACKGROUND

Very large digital images are relatively common in a number of areas. For example, remote sensing, meteorology, geology, and astronomy all rely on and generate very large images. For instance, a global map of the earth's vegetation can be greater than 100 gigabytes in size. The creation of these large images may be performed by collaging relatively small images through a mapping of the input images into the output image space with a merge of the overlapping areas. Traditionally, this collaging process may rely on several nodes in a computing system to perform the process, but the information generated by each node is written to the file system and then read from the file system by other nodes to perform a subsequent step. This intermediate writing and reading of data to the file system memory heavily relies on high I/O bandwidth central storage and redundant I/O operations, both of which limit the scalability of the process.

SUMMARY

Embodiments of the present invention relate to systems, methods, and computer-storage media for collaging image data to form a large image using high-performance computing in a parallel computing environment. The collaging of the image data includes performing an intra-node (i.e., within a common node) merge operation on image data such that the merged intra-node data is not written to the file system, but instead maintained in volatile processor memory. The intra-node merged data is then communicated in a memory-to-memory manner over a high-speed network to another node in the system for an inter-node (i.e., node-to-node) merge operation, which limits the number of intermediate system I/O operations to perform the collaging process. Following the intra-node and inter-node merge operations, tiles representing the collaged image are available for use.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
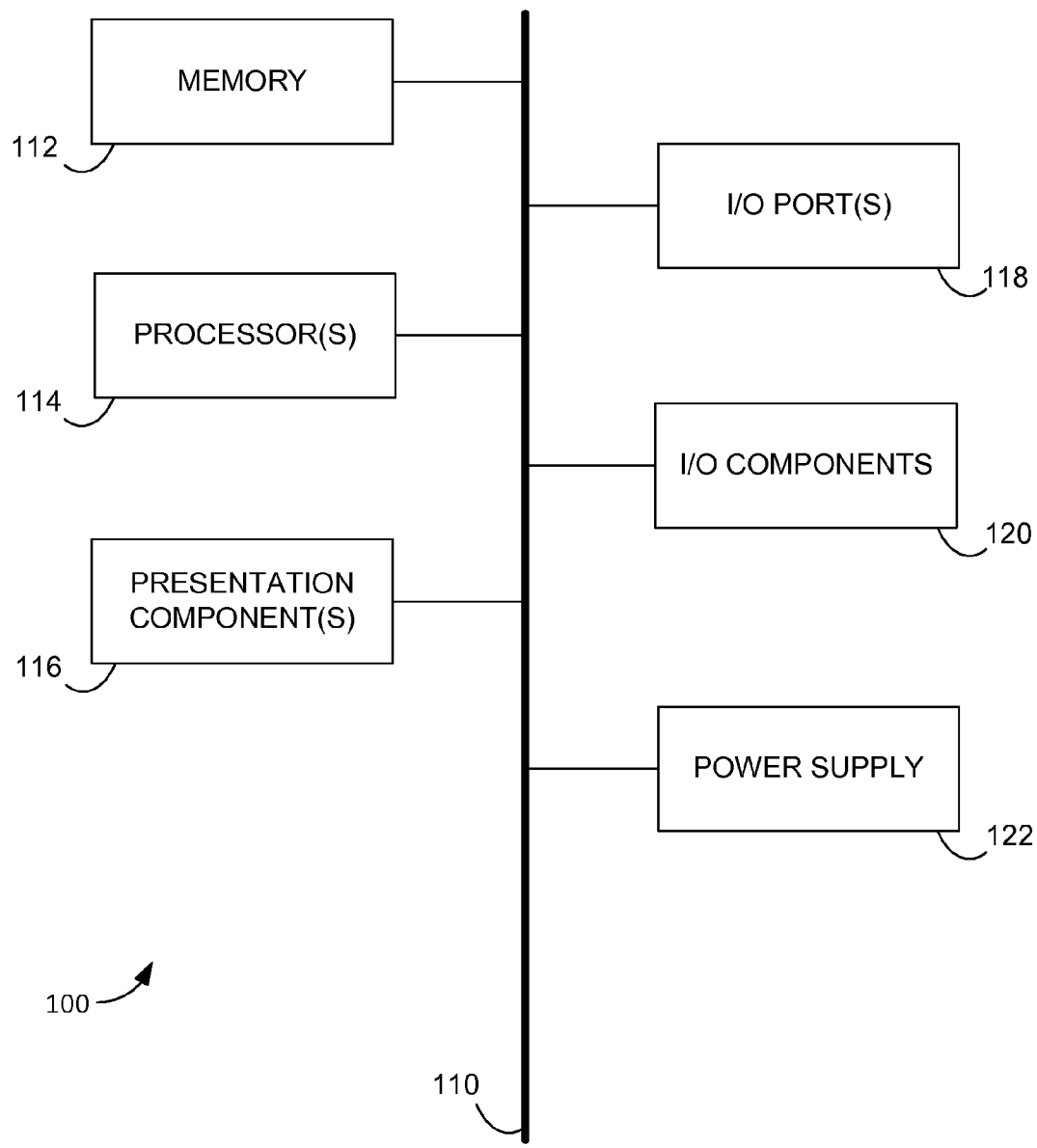
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer-storage media for collaging image data to form a large image using high-performance computing in a parallel computing environment. The collaging of the image data include performing an intra-node merge operation on image data such that the merged intra-node data is not written to the file system, but instead maintained in volatile processor memory. The intra-node merged data is then communicated in a memory-to-memory manner over a high-speed network to another node in the system for an inter-node merge operation, which limits the number of intermediate system I/O operations to perform the collaging process. Following the intra-node and inter-node merge operations, tiles representing the collaged image are available for use.

Accordingly, in one aspect, the present invention provides a computer-implemented method in a computing environment utilizing a processor and memory for collaging image data. The method includes receiving, through a computing network, a first plurality of image data inputs at a first node. The method continues with intra-node merging portions of the first plurality of image data inputs at the first node. This intra-node merging forms a first merged image data set. At the first node, the method continues with receiving data from a second node about a second merged image data set. The first merged image data set and the second merged image data set represent portions of a common image. The method continues with communicating, memory-to-memory from the second node to the first node, a portion of the second merged image data for a cross-node merge. The portion of the second merged image data set is not written to the file system memory prior to being communicated to the first node. At the first node, a cross-node merging is performed on the portion of the second merged data set with the first merged image data set at the first node to form a cross-node merged image data set. The cross-node merged image data set is then written to a file system memory on a computer readable storage media.

In another aspect, the present invention provides computer-storage media having computer-executable instructions embodied thereon, that when executed by a computing system having a processor and memory, cause the computing system to perform a method. The method includes receiving a first plurality of image data inputs at a first node and receiving a second plurality of image data inputs at a second node. The first node and the second node provide parallel processing in a distributed computing environment. The method continues without performing a file system memory I/O operation with respect to the following intra-node merge. Intra-node merging portions of the first plurality of image data inputs at the first node forming a first merged image data set. The method continues with receiving metadata from a second node about a second merged image data set formed at the second node from the second plurality of image data inputs. The method also includes communicating, memory-to-memory from the second node to the first node, a tile portion of the second merged image data for a cross-node merge. The method is further comprised of cross-node merging the tile portion of the second merged data set with the first merged image data set at the first node to form a cross-node merged image data set.

A third aspect of the present invention provides a system for parallel processing image data using map-reduce and message passing interface communication for collaging image data. The system includes a first computing node comprising a processor, processor memory, an inter-node data switching component, and computer-storage media having computer-executable instructions embodied thereon to perform a method comprising intra-node merging of image data and inter-node merging of image data. The intra-node merge of data produces a merged image data set that is not written to a file system memory. The system is further comprised of a second computing node comprising a processor, processor memory, inter-node data switching component, and computer-storage media having computer-executable instructions embodied thereon to perform the method.

Having briefly described an overview of embodiments of the present invention, an exemplary operating environment suitable for implementing embodiments hereof is described below.

Exemplary Operating Agreement

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," "tablet," "phone," "node," etc., as all are contemplated within the scope of FIG. 1 and refer to "computer" or "computing device." In particular, aspects of the present invention are contemplated as being performed in whole or in part on one or more components of a distributed computing system. It is contemplated that a distributed computing system may be comprised of processors, networks, and memory that scale to handle a desired level of computing processes at a time. Therefore, it is contemplated that a computing device may also refer to the computing environment of a distributed computing system that dynamically changes with time and/or demand.

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-storage media and communication media. Computer-storage media includes volatile and nonvolatile, removable and non-removable media implemented in any method or technology for storage of information such as computer-readable instructions, data structures, program modules or other data.

Computer-storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes non-transitory, solid-state memory, hard drives, optical-disc drives, etc. Computing device 100 includes one or more processors 114 that read data from various entities such as bus 110, memory 112 or I/O components 120. Presentation component(s) 116 present data indications to a person or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, touch pad, touch screen, three-dimensional camera technology, etc.

A distinction will be drawn throughout between storing information to "processor memory" and a "file system memory." The primary distinction between the "processor memory" and the "file system memory" storage involves the speed of I/O operations for each. For example, when data is written to or retrieved from "processor memory" it is implied to have a very fast I/O access time relative to retrieving or writing the same data to a "file system memory." In another example, a processor may maintain information in "processor memory" for access during processing. This processor memory, in an exemplary aspect, is non-persistent memory. For example, when power is interrupted to the non-persistent (i.e., "volatile") memory, the data maintained in the memory is lost. To the contrary, the file system memory, in an exemplary aspect, is persistent (i.e., "non-volatile") memory that is accessible even after a disruption of the power supply.

Traditionally, the fast I/O memory is Random Access Memory ("RAM"), which is used by the system to store data for processing by a processor. RAM stores the data in memory cells that are arranged in grids much like the cells are arranged in a spreadsheet, from which data, in the binary form of 1's and 0's, can be accessed and transferred at random to the processor for processing by the system's software. This is in contrast to the file system memory, which traditionally may be a disk drive that cannot be accessed at random. Whole sectors, containing blocks of data, are transferred from a hard disk drive, placed in a large swap file on the same drive, and only then are selected files transferred to RAM for random access by the processor, in an exemplary aspect. Therefore, the file system memory has longer I/O access times than the processor memory and provides persistent storage of data that is eventually placed in the processor memory. Stated differently, data stored in the file system must first be read from the file system memory to then be stored in the processor memory before being accessed by the processor. Data stored in the processor memory may be directly accessed by the processor for processing.

Exemplary Aspects of Collaging Image Data with Intra-Node and Inter-Node Merging Aspects of the present invention are directed to collage images into a larger image. This concept of collaging images is used in a variety of settings, such as remote sensing, meteorology, geology, and/or astronomy. For example, a global map of the Earth's vegetation can exceed 100 gigabytes of data. This earth map may be formed by collaging relatively small image portions together to form the earth encompassing image. The large collaged image may ultimately be stored persistently as a series of "tiles" that each represents a discrete portion of the overall image.

The collaging of the individual image portions to form the macro image (i.e., the large image formed from collaging the individual images) may be performed, in an exemplary aspect, by a parallel computing environment that relies on a high performance computing cluster of computers. A parallel computing program can efficiently collage the individual images into the macro image by launching the process in each of the computers. Each of the processes running/operating on the computers is responsible for reading an input data set, such as some input images, and ultimately outputting one or more portions (or the entirety) of one or more tiles representing the macro image.

The process performed on the computers may initially map the input data set into tile of the macro image space. Stated differently, it is contemplated that the input data set may be projected onto the macro image space that represents the area of the final macro image to identify a location within the macro image to which each of the individual images contribute. The process may then merge portions of the input data set that represent common locations within the tile/mapped macro image space. The merging may reduce an amount of data used to represent a particular portion of a macro image and/or to select an optimal representation of data for that location of the macro image. This intra-computer merged data set (e.g., data that has been merged internally at the node from data accessed at the node) representing one or more portions of one or more tiles of the macro image is maintained in the processor memory.

Each of the computers (or processes) provides and receives metadata describing the tiles of the macro image for which they have data representing. As such, a first node is aware of data that it has and also of a second node in the computing system that also has at least some overlapping data. This transfer of metadata is used by the nodes to facilitate an inter-node merge operation in which overlapping portions of the intra-node merged data is communicated from a first node to a second node via a fast interconnection technology, such as InfiniBand and/or 10 Gigabyte Ethernet. Examples of interconnection technology include a switched fabric communications link with features that provide include high throughput, low latency, quality of service and failover, and that is designed to be scalable. A 10 gigabit Ethernet refers to technology for transmitting Ethernet frames at a rate of 10 gigabits per second (10 billion bits per second), which is defined by the IEEE 802.3ae-2002 standard, hereby incorporated by reference in its entirety.

The transfer of data between nodes may be done with a message-passing system that is widely accepted in parallel computing systems, such as Message Passing Interface ("MPI"). The message passing system may define the syntax and semantics of a core of library routines that are useful to a wide range of users writing portable message-passing programs in Fortran 77 or the C programming language. The message-passing system interface may provide essential virtual topology, synchronization, and communication functionality between a set of processes that have been mapped to nodes/servers/computer instances in a language-independent way, with language-specific syntax (bindings). Therefore, a message-passing system that is designed for parallel computing and a fast interconnection technology allows for a memory-to-memory transfer of overlapping data that can be used in an inter-node merge operation.

The inter-node merging of data that does not rely on writing and reading data to one or more file system memories allows the inter-node merge to occur at a greater rate that is aligned with the processing power of the nodes, in an exemplary aspect. Stated differently, by having the message-passing system and the fast interconnection technology, an inter-node merge operation may rely on a memory-to-memory (e.g., non-persistent to non-persistent memory, volatile-to-volatile memory, processor memory to processor memory) transfer as opposed to writing the data to a file system at one node and then reading the data from the file system at another node. Avoiding the file system I/O operations eliminates intermediate I/O operations in the inter-node merge.

Once the inter-node merge operation is complete at a node, the node has one or more tiles of the macro image space that may either be committed to a file system and/or used as part of a subsequent intra-node merge or an inter-node merge with additional data, in an exemplary aspect.

Exemplary System Environment

Figure 2:
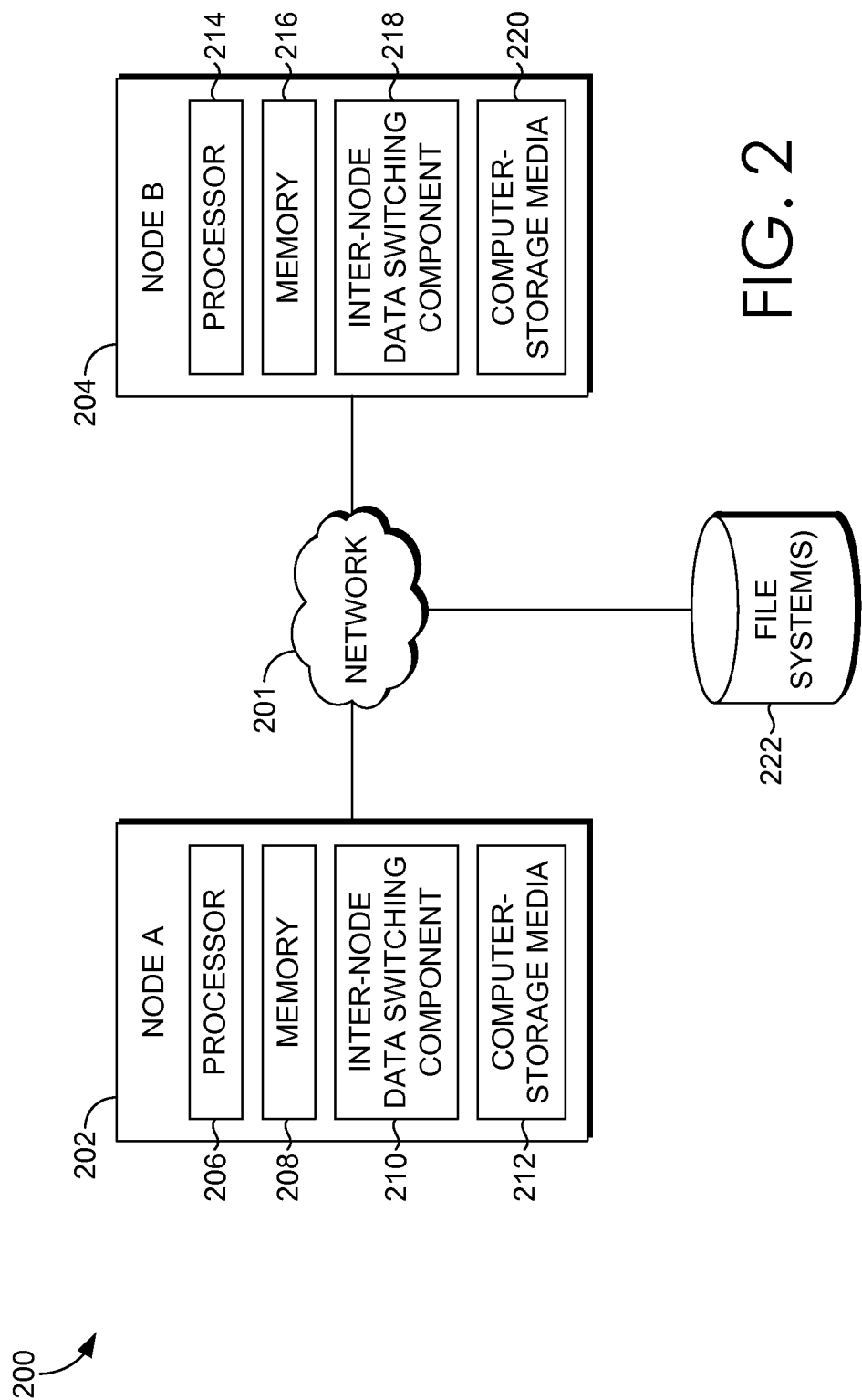
FIG. 2 depicts an exemplary system in which embodiments of the present invention may be employed.

With reference to FIG. 2, a block diagram is provided illustrating an exemplary system 200 in which embodiments of the present invention may be employed. It should be understood that this and other arrangements described herein are set forth only as examples. Other arrangements and elements (e.g., machines, nodes, networks, interfaces, functions, orders, and grouping of functions, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a node A 202, a node B 204, a network 201, and a file system 222. A node is a computer or computing process (e.g., a virtual machine) that is functional to perform one or more computing processes in a distributed computing environment. For example, it is contemplated that a server may be referred to as a node in a computing system. Similarly, a virtual machine, which is one of a plurality of virtual machines operating on a common physical server, may also be considered a node in an exemplary aspect. In an exemplary aspect, the node A 202 and the node B 204 are two nodes that are accessible in a distributed computing environment to perform a map-reduce process in a parallel computing architecture on image data for the purpose of collaging a macro image from a plurality of individual images. The node A 202 and the node B 204 may be physically separate computing devices or they may be distinct from one another as separate virtual instances of a computing system.

The network 201 is a computing network, which may include, without limitation, one or more local area networks (LANs) and/or wide area networks (WANs). Such networking environments are commonplace in offices, enterprise-wide computer networks, intranets, and the Internet. Further, as described above, it is contemplated that the network 201 may be functional to support a message-passing system (e.g., MPI) and the fast interconnection technology (e.g., 10 gigabyte Ethernet) that facilitates memory-to-memory communication between nodes without requiring a file system I/O operation with the transferred data.

The file system 222 is a file system supporting one or more nodes of the system 200. In an exemplary aspect, each node has its own file system that is different and distinct from another node's file system. However, for illustration purposes, the file system 222 is depicted as a common file system that is accessible by the node A 202 and the node B 204 by way of the network 201. However, as indicated above, it is also contemplated that a unique file system is accessible only by the node A 202 and a different unique file system is only accessible by the node B 204, in an exemplary aspect. The file system 222 is a data store, which may be comprised of one or more computer readable media for storing data, such as image data. Traditionally, as discussed above, I/O operations are directed to the file system 222 to write merged image data and retrieve merged image data prior to performing an inter-node merge operation. However, this I/O operation may be omitted by leveraging a memory-to-memory communication of the to-be-merged data directly between nodes. Stated differently, an intermediate I/O operation may be omitted for using intra-node merged data that will be merged across a plurality of nodes. Omission of this intermediate I/O operation allows for increased efficiency and availability of inter-node data operations.

The node A 202 is comprised of a processor 206, memory 208 (e.g., processor memory), an inter-node data switching component 210, and computer-storage media 212. Similarly, the node B 204 is comprised of a processor 2014, memory 216 (e.g., processor memory), an inter-node data switching component 218, and computer-storage media 220.

The processors 206 and 214 may be physical processors dedicated solely to the execution and processing of data for the respective nodes. Alternatively, it is contemplated that the processors 206 and 214 are non-dedicated processors that provide processing times to the respective nodes, such as when the nodes are virtual machines.

As discussed above, the memory 208 and 216 may be processor memories that provide memory accessible directly by the processor 206 and 214 respectively. In an exemplary aspect, the memories 208 and/or 216 are volatile memory. Similarly, it is contemplated that intra-node merged image data may be maintained in the memory 208 and/or 216 in preparation for an inter-node merge operation without using the file system 222, in an exemplary aspect. Also, it is contemplated that the memory 208 and/or 216 are computer readable media, as provided hereinabove.

The internode data switching component 210 and 218 facilitate the communication of data between two nodes, such as the node A 202 and the node B 204. For example, the internode data switching component 210 and 218 may be functional components that support MPI or other message-passing systems over high-speed connections. As a result of this supported functionality by the internode data switching component 210 and 218, each of the node A 202 and the node B 204 support memory-to-memory image data transfers that avoid intermediate I/O operations to the file system 222.

It is further contemplated that the internode data switching component 210 and 218 provide functionality for communicating and receiving metadata regarding one or more portions of image data. For example, to identify overlapping tiles of the macro image space, the node A 202 and the node B 204 may communicate with one another identifying which tiles of the image space they have data. This metadata is used by each of the nodes to determine what data should be communicated between each other for an inter-node merger operation(s). The functionality of the internode data switching component 210 and 218 may be provided in software and/or hardware. For example, computer readable media may store instructions that when executed, support the functionality identified herein for the internode data switching component 210 and 218.

The computer-storage media 212 and 220 store instructions that when executed, perform methods for collaging image data. For example, the methods may include those steps discussed hereinafter at FIG. 4. The computer-storage media 212 and 220 may also include instructions related to the distributed computing system that allows for the integration of the respective node and its components into the distributed computing system. For example, operating system-related instructions may be maintained in the computer-storage media 212 and 220. Further, map-reduce intra-node merger operations, inter-node merger operations, and communication functions are other examples of instructions for methods that may be maintained in the computer-storage media 212 and 220.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting.

Exemplary Image Collaging Steps

Figure 3:
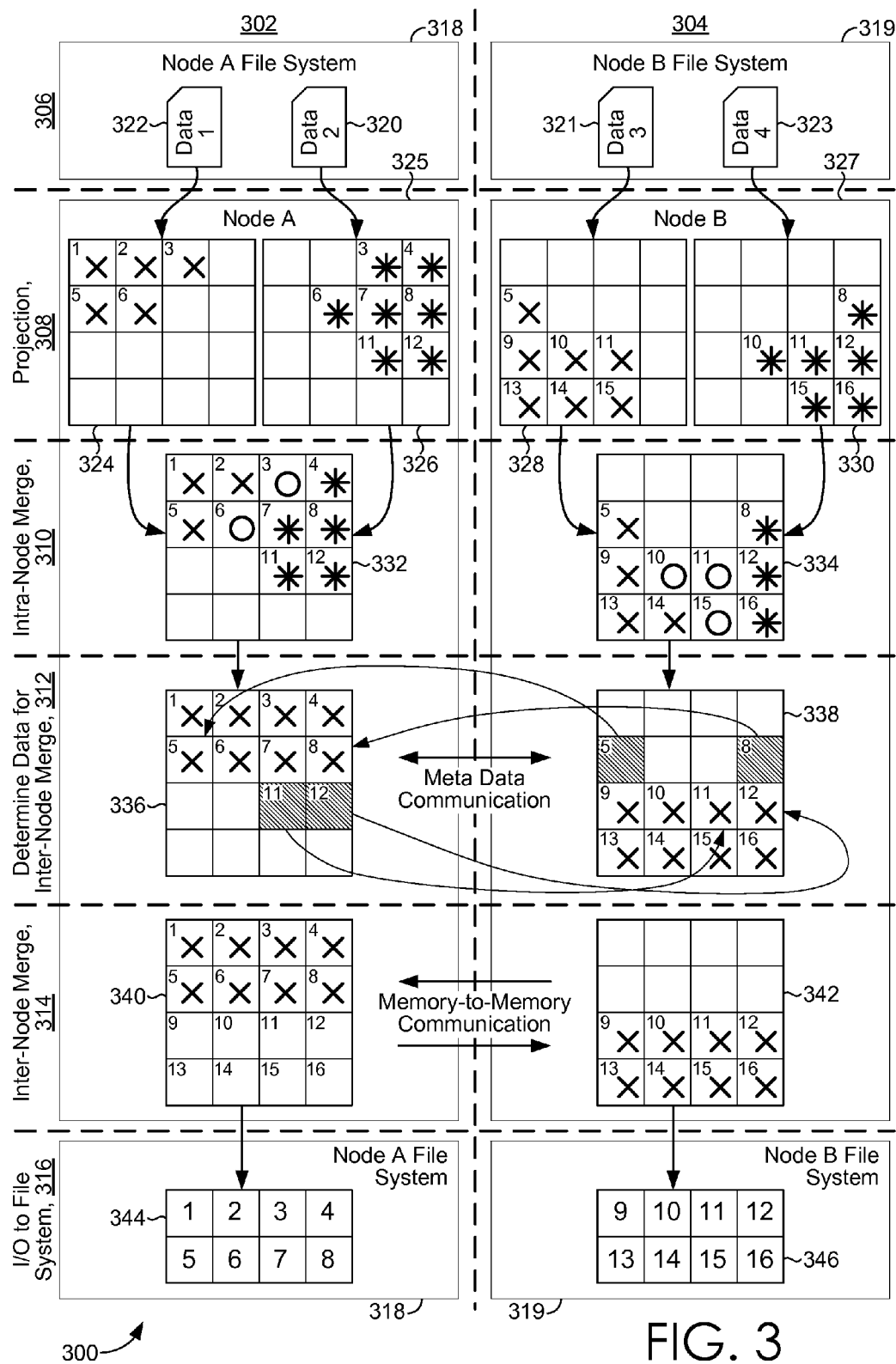
FIG. 3 depicts visualized steps of a method for collaging image data as a macro image using intra-node merge and inter-node merge operations, in accordance with aspects of the present invention.

FIG. 3 depicts visualized steps of a method 300 for collaging image data as a macro image using intra-node merge and inter-node merge operations, in accordance with aspects of the present invention. A first column 302 of FIG. 3 represents activity performed at a first node, node A. A second column 304 represents activity performed at a second node, node B. While only two nodes are depicted in FIG. 3 for illustrative purposes, it is contemplated that the distributed computing environment of which node A and node B are members may include any number of nodes that interact in any combination.

FIG. 3 also includes a number of "rows" demarcated by the dashed horizontal lines. The various rows labels 306, 308, 310, 312, 314, and 316 represent exemplary "steps" within the method 300. While specific steps are discussed and illustrated, it is contemplated that additional steps may be performed in an exemplary aspect. Further, it is contemplated that one or more of the illustrated steps may be omitted altogether, in an exemplary aspect.

At a step 306, node A receives a first image data set 322 and a second image data set 320. The first image data set 322 and the second image data set 320 represent data expressing one or more images (or image portions). For example, the two image data sets may include image data representing a similar, but not necessarily the same, geographical region, such as a street, city, county, state, region, country, and the like. Further, while only two image data sets are shown in connection with node A, it is contemplated that any number of data sets may be introduced in any order to node A for a collaging process to be implemented. The first image data set 322, in an exemplary aspect, is comprised of several discrete images that may be collaged to form a portion of the resulting macro image.

At the step 306, the receiving of the image data set may include retrieving the image data sets from a file system or processor memory. Further, it is contemplated that the image data sets may be received in response to another element within the distributed computing environment communicating the image data to the receiving node, node A in this example. The node B column 304 also depicts node B receiving a plurality image data sets, such as a third image data set 321 and a fourth image data set 323.

At the step 308 a projection of the image data sets onto the macro image space is performed. The projection includes identifying "tiles," discrete portions of the macro image, for which the image data sets include data describing the tiles. For example, the first image data set 322 is projected on to the image space of the macro image to provide image data for tiles 1, 2, 3, 5, and 6, as depicted by the "X" symbols in a first macro image space 324 depiction at column 302, row 308. Similarly, the projection of the second image data set 320 results in tiles 3, 4, 6, 7, 8, 11, and 12 being represented by the second image data set 320, as depicted with the asterisk symbols in a second macro image space 326 depiction at column 302, row 308.

While an exemplary macro image space having 16 discrete tiles is depicted, it is contemplated that any size of macro image space may be implemented. Further, it is contemplated that tiles lacking uniformity may be used and a non-rectangular tile or macro image space may also be implemented. The macro image projection space represents a space that once populated with image data will provide a macro image. For example, the macro image space may be conceptually thought of as the "canvas" onto which the final image will be place. Such that the canvas is the size and shape of the final image and is also subdivided into identifiable portions, tiles. Clearly the concept of a "canvas" is purely for illustrative purposes and is not limiting as to the concepts of the present invention.

At the node B, the projection step 308 results in the third image data set 321 being projected onto tiles 5, 9, 10, 11, 13, 14, and 15 of the macro image space, as depicted by the "X" symbols in a third macro image space 328 in column 304, row 308. The fourth image data set 323 of the node B is projected onto the tile 8, 10, 11, 12, 15, and 16 of the macro image space, as depicted by the asterisks in a fourth macro image space 330 depiction of column 304, row 308. In this example, all of the macro image spaces 324, 326, 328, and 330 represent the same macro image. Therefore, between the four image data sets, data representing all sixteen of the tiles is provided. Several of the tiles (i.e., 3, 6, 10, 11, and 15) are represented by more than one image data set, as will be discussed in the step 310 intra-node merge operation. However, it is contemplated that additional (or fewer) image data set may be needed to provide sufficient data to represent the entire macro image space, in an exemplary aspect.

The first macro image space 324 and the second macro image space 326 are merged within the node A to form the intra-node merge data set, as depicted in a first intra-node merged macro image space 332 ("first intra-node space 332"). The first intra-node space 332 depicts the merging of the first image data set 322 with the second image data set 320 as projected into the macro image space. Areas of data overlap within the macro image space are identified with an "O" symbol. For example, the tiles 3 and 6 are represented by data both in the first image data set 322 and the second image data set 320. As such, upon the merge of the two data sets within the node A, the first intra-node space 332 consists of data for tile 1-8 and 11-12.

The merge of multiple data sets identifies overlapping data at tiles and removes, reduces, or otherwise manipulates data that is redundant. For example, a comparison may be performed to identify characteristics of the overlapping data to determine which portion should be maintained to provide consistent data across the tiles. Further, it is contemplated that the merge operation maintains the redundant data, but determines a preferred representation of the determined data space. Regardless of how the redundant data is handled, the merge operation merges two (or more) image data sets into a common representation of a portion of the macro image space. Stated differently, a merge operation, regardless if it is done as an intra-node or an inter node merge may also be expressed as a combining step. Such that two discrete data sets are combined to form a single data set. Another appropriate term for exemplary aspects to describe the merge operation is an aggregation process that forms a whole data set from disparate data sets.

A similar intra-node merge operation is performed on the node B, resulting in a second intra-node merged macro image space 334 ("second intra-node space 334"). The tiles of the second intra-node space 334 represented by the third image data set 321 and the fourth image data set 323 consist of 5, 8, and 9-16. Overlapping tiles between the two data sets include tiles 10, 11, and 15, as represented by the "O" symbol.

An intra-node merge is an operation that is performed by a node with data maintained in the node. Stated differently, the data that is merged in an intra-node merge operation is data that is accessible within the processor memory of that node. For example, following a projection of data, the projected data is maintained in the processor memory of the node, which prevents the node from relying on I/O operations to the file system memory for the data to be merged. The avoidance of relying on file system I/O operations reduces processing time for the merge operation, which can decrease the time for collaging individual images into a macro image, in an exemplary aspect.

The projection step 308 and the intra-node merge step 310 may be considered a "mapping" operation in a map-reduce context. The steps discussed hereinafter for determining data for an inter-node merge and performing the inter-node merge (steps 312 and 314) may be connected with a "reduce" operation in a map-reduce context, in an exemplary aspect.

At the step 312 for determining data to be included in an inter-node merge operation, overlapping tiles from the first intra-node space 332 and the second intra-node space 334 are identified. In an exemplary aspects, the nodes operating within the distributed computing environment that are working on collaging image data for a common macro image communicate metadata with one another. The metadata may include a listing of tiles for which their respective intra-node merge operation provided. Because each of the nodes is aware of the tiles they have data representing as well as tiles that other nodes have available at a given time, a determination may be may at one or more nodes as to what data representing tiles should be communicated (or received) to perform an inter-node merge.

An inter-node merge is a merge operation (e.g., combine operation, aggregate operation) that occurs with data from two or more nodes. However, unlike traditional cross-node merges that rely on accessing the data of another node through accessing the file system memory, aspects of the present invention instead perform a memory-to memory transfer of the determined data. This memory-to-memory transfer of data eliminates the traditional intermediate file system memory I/O operations of writing the data of a first node to the file system and then the reading of the data from the file system by the second node. When these intermediate I/O operations are eliminated (or reduced) over millions of inter-node mergers, a significant reduction in processing time may be achieved in the collaging of a macro image from different image data sets.

The node A and the node B communicate information regarding the tiles for which they have data at the step 312. As a result of this communication, node A and/or node B may determine that tiles 5, 8, 11, and 12 represent overlapping tile data, as depicted in the macro image space depictions 336 and 338, should be merged in an inter-node merge operation. Based on this, a determination may be made that data representing tiles 11 and 12 should be communicated form node A to node B for an inter-node merge operation to be performed at node B. Similarly, a determination may be made that data representing tiles 5 and 8 should be communicated from node B to node A for an inter-node merge operation to be performed at node A.

The determination may be made on a number of factors. For example, node A may identify what tiles are in a series at node A are represented by data at other nodes. In this example, node A has data representing the series of tiles 5-8; therefore, any data from other nodes in that completed series should be merged at node A, in this example. Similarly, node B has a complete tile series of 9-12; therefore, any data from completed series should be merged at node B. A completed series may be defined by a number of criteria. For example, two abutting tiles may form a complete series. Similarly, a series may be determined not on the spatial orientation of the tiles, but instead based on a load balancing algorithm to achieve an optimal processing time.

As alluded to above, at the step 314, data representing the overlapping tile portions are communicated in a memory-to-memory manner between the nodes for an inter-node merging operation to be performed at the receiving node. In this example, the inter-node merge results in an image space 340 having data for tiles 1-8 at node A and an image space 342 having data for tiles 9-16 at node B.

The merge operation may result in the removal of data representing tiles 11 and 12 from the node A data set and similarly data representing tiles 5 and 8 may be removed from the node B data set, in an exemplary aspect.

The memory-to-memory communication may rely on a message passing interface and a high-speed data transmission technology to achieve sufficient data transmission rates that allow the processor of node A to utilize the data from node B (and vise-versa). This memory-to-memory communication may be a processor memory to processor memory transfer of information. This is in contrast to node A writing the data representing tiles 11 and 12 to a file system, which may then be communicated to or directly accessed by the node B. Then node B would read the data representing tiles 11 and 12 from the file system to be stored in the processor memory for access by the processor of node B. By utilizing a memory-to-memory transfer, the intermediate I/O operations are eliminated.

At a step 316, the inter-node merged data set at each of the nodes may then be written to the file system for further processing. For example, the inter-node merged data of node A is written to the node A file system 318 as depicted by tiles 1-8 of space mapping 344. Similarly, the inter-node merged data of node B is written to the node B file system 319 as depicted by tiles 9-16 of space mapping 346.

Further, while not depicted, it is contemplated that the inter-node merged data may be maintained in the processor memory and not written to the file system memory so that additional memory-to-memory transfers of data may occur to complete (or progress) the collaging of the data to form the macro image. For example, it is contemplated that the inter-node merged data of node A is then communicated to another node for merging of additional data, if needed in an exemplary aspect. However, it is also contemplated that once the tiles of the macro image space are completed and tile series are formed from the intra-node and inter-node merging operations, the tiles may be maintained in the file system memory and accessed in a typical manner for forming the macro image.

While specific nodes, data sets, tile space, and the like are illustrated in FIG. 3, it is contemplated that any number of node, tile space, data sets, and the like may be implemented. Further, it is contemplated that additional and/or alternative steps may be implemented in connection with FIG. 3. Additionally, it is contemplated that one or more steps may be omitted, re-arranged, or combined in an exemplary aspect.

Figure 4:
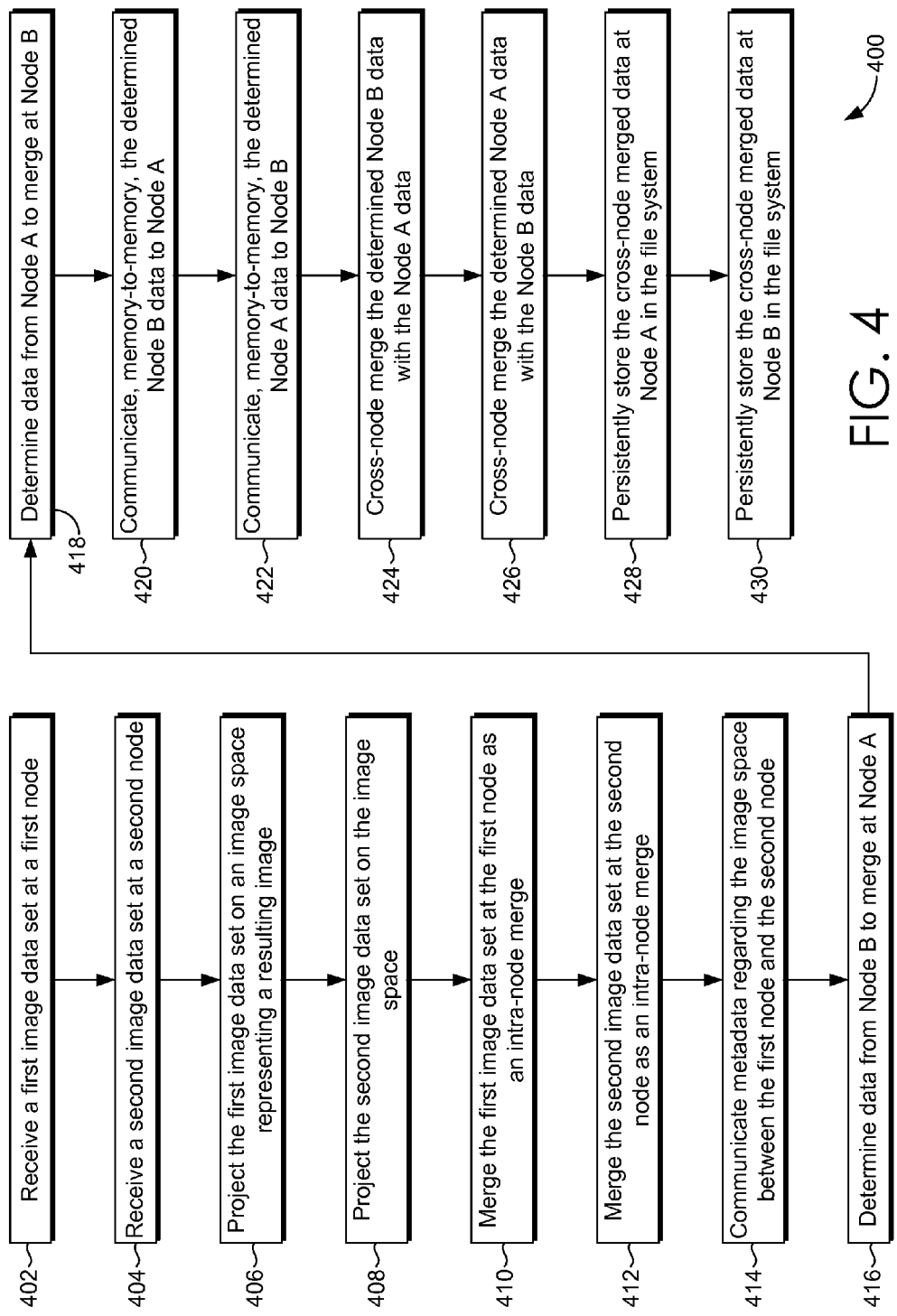
FIG. 4 depicts a method for collaging image data with intra-node and inter-node merge operation utilizing a memory-to-memory data communication, in accordance with aspects of the present invention.

FIG. 4 depicts a method 400 for collaging image data with intra-node and inter-node merge operation utilizing a memory-to-memory data communication, in accordance with aspects of the present invention. A block 402 represents a step of receiving a first image data set at a first node. In an exemplary aspect, the first image data set may be comprised of two or more discrete data sets. For example, a node A may receive the first image data set, which actually includes data represent a first group of tiles and a second group of data representing a different set of tiles. Further, it is contemplated that the receiving of the data may include accessing the data from a file system memory or receiving the data in a memory-to-memory transfer from another node.

At a block 404, a step of receiving a second image data set at a second node is depicted. Similar to the receiving the first image data set, the second image data set may be comprised of multiple discrete image data sets.

At a block 406, a step of projecting the first image data set on an image space representing the resulting image is depicted. The processes of projecting the image data set include identifying a group of tiles for the resulting macro image that are represented by the first image data set. A block 408 depicts a step of projecting the second data set on the image space at the second node.

A block 410 represents merging the first data set at the first node as an intra-node merge. For example, the first image data set may include two discrete image data sets that include some overlapping tile information (or no overlapping tile information). The discrete image data sets are merged within the first node and maintained in volatile memory and not written to the file system. A block 412 represents the merging of the second image data set at the second node as an intra-node merge operation. This merged data set is not written to the file system and instead is maintained in the processor memory. The operation at blocks 410 and 412 may be performed such that the resulting intra-node merged data file is not part of a file system I/O operation, but is instead maintained in the processor memory for subsequent utilization in an inter-node merging operation. Stated differently, the intra-node merged data is not maintained in persistent memory, in an exemplary aspect.

At a block 414, the first node and the second node communicate metadata regarding the image space. For example, the first node may communicate the tiles within the image space that the first node has data. Similarly, it is contemplated that the second node communicates metadata representing an indication of the tile for which it has data. This metadata communication may be performed on a push and/or a pull basis. Similarly, it may be controlled by a master node or it may be a general broadcast that is received by all node of the system.

At a block 416, a determination is made as to what data the second node (e.g., node B) has that is to be merged with the first node (e.g., node A). The determination may identify data maintained in processor memory at node B that overlaps with a series of tiles represented by data at node A. Similarly, at a block 418, a determination is made of data maintained at the first node that is to be merged with data at the second node.

At a block 420, a memory-to-memory communication of the determined data from the second node is communicated to the first node. In this example, the first node does not read the data from a file system memory (e.g., file system memory of the first node, file system memory of the second node, or a shared file system memory). This memory-to-memory communication may be performed with a message passing interface over a high-speed network connection, such as a 10 gigabyte Ethernet. Similarly, at a block 422, the determined first node data is communicated to the second node in a memory-to-memory communication. In this example, the second node does not read the data from the file system, but instead relies on the memory-to-memory transfer to provide the data to the processor memory of the second node.

At a block 424 a cross-node merge (i.e., inter-node merge) of the determined second node data and the first node data is performed at the first node. Similarly, a block 426 represents a cross-node merge of the determined first node data with the second node data at the second node.

At a block 428, the cross-node merged data at the first node is persistently stored to the file system memory of the first node. Similarly, at a block 430, the cross-node merged data of the second node is persistently written to the file system of the file system of the second node.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method in a computing environment utilizing a processor and memory for collaging image data, the method comprising:
    receiving, through a computing network, a first plurality of image data inputs at a first node;
    intra-node merging portions of the first plurality of image data inputs at the first node forming a first merged image data set;
    receiving, at the first node, data from a second node about a second merged image data set, the first merged image data set and the second merged image data set represent portions of a common image;
    communicating, memory-to-memory from the second node to the first node, a portion of the second merged image data for a cross-node merge, wherein the portion of the second merged image data set is not written to the file system memory prior to being communicated to the first node;
    at the first node, cross-node merging the portion of the second merged data set with the first merged image data set at the first node to form a cross-node merged image data set; and
    writing the cross-node merged image data set to a file system memory on a computer readable storage media.

2. The computer-implemented method of claim 1 further comprising projecting the first plurality of image data inputs onto tiles of an output image space representing the common image.

3. The computer-implemented method of claim 1, wherein the first merged image data set is not written to the file system memory.

4. The computer-implemented method of claim 1, wherein the second merged image data set is not read from the file system memory.

5. The computer-implemented method of claim 1 further comprising communicating data from the first node to the second node about the first merged image data set.

6. The computer-implemented method of claim 1, wherein there is not a file system Input/Output (I/O) operation of the first merged image data or the second merged image data.

7. The computer-implemented method of claim 1, wherein the first node and the second node are parallel computing nodes.

8. The computer-implemented method of claim 1 further comprising, at the first node, determining that the portion from the second merged data set is to merge with a portion from the first merged data set.

9. The computer-implemented method of claim 1, wherein the common image represents remote sensing, meteorology, geology, or astronomy related data.

10. The computer-implemented method of claim 1, wherein the memory-to-memory communication utilizes a Message Passing Interface-based data switching.

11. The computer-implemented method of claim 1, wherein the memory-to-memory communication utilizes a switched fabric topology.

12. One or more computer-storage media having computer-executable instructions embodied thereon, that when executed by a computing system having a processor and memory, cause the computing system to perform a method, the method comprising:
   receiving a first plurality of image data inputs at a first node;
   receiving a second plurality of image data inputs at a second node, wherein the first node and the second node provide parallel processing in a distributed computing environment;
   without performing a file system memory Input/Output (I/O) operation, intra-node merging portions of the first plurality of image data inputs at the first node forming a first merged image data set;
   receiving metadata from a second node about a second merged image data set formed at the second node from the second plurality of image data inputs;
   communicating, memory-to-memory from the second node to the first node, a tile portion of the second merged image data for a cross-node merge; and
   at the first node, cross-node merging the tile portion of the second merged data set with the first merged image data set at the first node to form a cross-node merged image data set.

13. The computer-storage media of claim 12, wherein receiving the first plurality of image data inputs comprises reading the first plurality of inputs from a computer readable memory.

14. The computer-storage media of claim 12, wherein the method further comprises projecting the first plurality of image data inputs to tiles of an output image space representing the common image.

15. The computer-storage media of claim 12, wherein a file system memory I/O operation allows for persistent storage.

16. The computer-storage media of claim 12, wherein the first merged image data set is not maintained in a persistent memory.

17. The computer-storage media of claim 12, wherein the memory-to-memory communication uses a switched fabric topology to communicate.

18. The computer-storage media of claim 12, wherein the metadata indicates one or more tiles of an image space representing the common image that overlap in the first merged image data set and the second merged image data set.

19. The computer-storage media of claim 12, wherein cross-node merging includes merging data representing a common portion of an image space representing the common image.

20. A computing system for parallel processing image data using map-reduce and message passing interface communication for collaging image data, the system comprising:
   a first computing node, the first computing node comprising:
      (1) a processor,
      (2) processor memory,
      (3) inter-node data switching component, and
      (4) computer-storage media having computer-executable instructions embodied thereon to perform a method, the method comprising intra-node merging of image data and inter-node merging of image data, wherein the intra-node merge of data produces a merged image data set that is not written to a file system memory; and
   a second computing node, the second computing node comprising:
      (1) a processor,
      (2) processor memory,
      (3) inter-node data switching component, and
      (4) computer-storage media having computer-executable instructions embodied thereon to perform the method.

* * * * *